US008836413B2

(12) United States Patent
Gunther et al.

(10) Patent No.: US 8,836,413 B2
(45) Date of Patent: Sep. 16, 2014

(54) LOW-POWER RESISTOR-LESS VOLTAGE REFERENCE CIRCUIT

(75) Inventors: Andre Gunther, Sunnyvale, CA (US); Kevin Mahooti, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/607,562

(22) Filed: Sep. 7, 2012

(65) Prior Publication Data

US 2014/0070873 A1 Mar. 13, 2014

(51) Int. Cl.
*G05F 1/567* (2006.01)
*G05F 1/575* (2006.01)
*H02M 3/00* (2006.01)

(52) U.S. Cl.
USPC ............ 327/539; 327/540; 323/313; 323/315

(58) Field of Classification Search
None
See application file for complete search history.

(56) References Cited

U.S. PATENT DOCUMENTS

| | | | | |
|---|---|---|---|---|
| 8,072,259 | B1 * | 12/2011 | Isik | 327/538 |
| 8,305,068 | B2 * | 11/2012 | Camacho Galeano et al. | 323/313 |
| 8,330,526 | B2 * | 12/2012 | Vilas Boas et al. | 327/512 |
| 8,432,214 | B2 * | 4/2013 | Olmos et al. | 327/512 |
| 2009/0039949 | A1 * | 2/2009 | Pietrobon | 327/539 |
| 2010/0308902 | A1 * | 12/2010 | Iriarte et al. | 327/541 |
| 2011/0199069 | A1 * | 8/2011 | Singnurkar | 323/313 |

* cited by examiner

*Primary Examiner* — Lincoln Donovan
*Assistant Examiner* — Terry L Englund

(57) ABSTRACT

A method for generating a reference voltage includes generating a proportional-to-absolute temperature (PTAT) voltage across a first pseudo resistor. The first pseudo resistor includes a transistor. The method also includes converting the PTAT voltage to a current based on a resistance of the first pseudo resistor. The method also includes mirroring the current using a current mirror circuit and converting the mirrored current to a converted PTAT voltage using a second pseudo resistor. The second pseudo resistor includes a transistor. The first pseudo resistor and the second pseudo resistor include equal transistor types. The method also includes generating a complementary-to-absolute temperature (CTAT) voltage, and summing the converted PTAT voltage and the CTAT voltage to produce the reference voltage. The resulting reference voltage is temperature independent.

20 Claims, 7 Drawing Sheets

LOW-POWER RESISTOR-LESS VOLTAGE REFERENCE CIRCUIT

Microchips using complementary metal-oxide-semiconductor (CMOS) technology for memory, processors, and other components are often designed and manufactured to include a very large number of CMOS components in a very small space. Due to small space and low power requirements for many circuits and electronic devices, components that interact with memory devices, processors, and other CMOS components may also need to be designed and built within certain dimensions to reduce the size of the overall circuit and limit power consumption.

Voltage reference circuits are important building blocks of microchips because the voltage reference circuits provide a constant voltage regardless of process variation, temperature changes, power supply variations, and time. The reference voltage produced by a voltage reference circuit can be compared to output voltages of other components in the microchips to assure accuracy or to perform measurements. For example, voltage regulators use a reference voltage to compare a given output voltage to the reference voltage in order to create a temperature independent, constant output supply voltage.

In various embodiments of voltage reference circuits of the prior art, such as the conventional reference voltage circuit 100 shown in FIG. 1, the conventional voltage reference circuit 100 includes a set of resistors 102 that receive current from a current mirror circuit 104. The absolute value of the current is determined by a transistor pair 101 and resistor $R_1$. The conventional voltage reference circuit 100 is able to output a reference voltage 106, also referred to as $V_{out}$, based on the current value and a ratio of the resistor values, as well as other characteristics of the circuit. Reference voltage circuits are able to take advantage of CMOS technologies to generate a temperature independent, constant output voltage.

Embodiments of a circuit are described. In one embodiment, the circuit is a low power, resistor-less voltage reference circuit. The voltage reference circuit includes a proportional-to-absolute-temperature (PTAT) voltage generator configured to produce a PTAT voltage across a first pseudo resistor. The first pseudo resistor includes a transistor. The PTAT voltage across the first pseudo resistor produces a current based on a resistance of the first pseudo resistor. The voltage reference circuit also includes a current mirror circuit configured to mirror the current. The voltage reference circuit also includes a second pseudo resistor comprising a transistor. The second pseudo resistor is used to convert the mirrored current to the PTAT voltage. The first pseudo resistor and the second pseudo resistor have equal transistor types. The voltage reference circuit also includes a complimentary-to-absolute-temperature (CTAT) voltage generator configured to produce a CTAT voltage. The CTAT voltage is summed with the converted PTAT voltage to produce the reference voltage. The reference voltage is temperature independent. Other embodiments of a circuit are also described.

Embodiments of a system are described. In one embodiment, the system includes an electronic circuit configured to generate an output voltage. The system also includes a voltage reference circuit. The voltage reference circuit includes a proportional-to-absolute-temperature (PTAT) voltage generator configured to produce a PTAT voltage across a first pseudo resistor. The first pseudo resistor includes a transistor. The PTAT voltage across the first pseudo resistor produces a current based on a resistance of the first pseudo resistor. The voltage reference circuit also includes a current mirror circuit configured to mirror the current. The voltage reference circuit also includes a second pseudo resistor comprising a transistor. The second pseudo resistor is used to convert the mirrored current to the PTAT voltage. The first pseudo resistor and the second pseudo resistor have equal transistor types. The voltage reference circuit also includes a complimentary-to-absolute-temperature (CTAT) voltage generator configured to produce a CTAT voltage. The CTAT voltage is summed with the converted PTAT voltage to produce the reference voltage. The reference voltage is temperature independent. The system also includes a comparator configured to compare the output voltage of the electronic circuit to the reference voltage. Other embodiments of a system are also described.

Embodiments of a method are described. In one embodiment, the method is a method for generating a reference voltage. The method includes generating a proportional-to-absolute temperature (PTAT) voltage across a first pseudo resistor. The first pseudo resistor includes a transistor. The method also includes converting the PTAT voltage to a current based on a resistance of the first pseudo resistor. The method also includes mirroring the current using a current mirror circuit and converting the mirrored current to the PTAT voltage using a second pseudo resistor. The second pseudo resistor includes a transistor. The first pseudo resistor and the second pseudo resistor include equal transistor types. The method also includes generating a complimentary-to-absolute temperature (CTAT) voltage, and summing the converted PTAT voltage and the CTAT voltage to produce the reference voltage. The resulting reference voltage is temperature independent. Other embodiments of a method are also described.

Other aspects and advantages of embodiments of the present invention will become apparent from the following detailed description, taken in conjunction with the accompanying drawings, illustrated by way of example of the principles of the invention.

Throughout the description, similar reference numbers may be used to identify similar elements.

Figure 1:
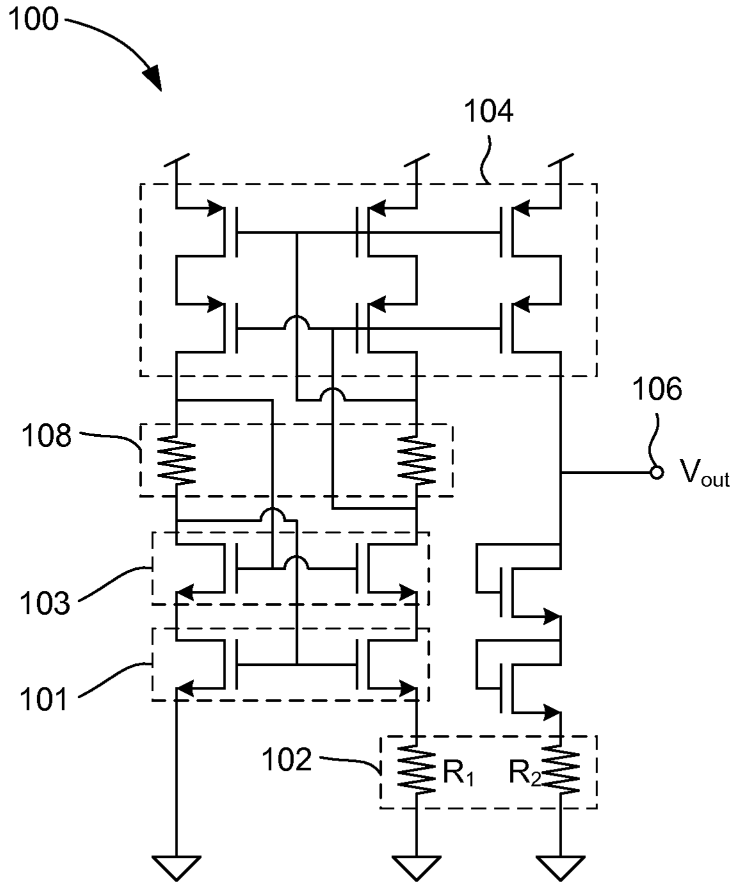
FIG. 1 PRIOR ART
FIG. 1 depicts a schematic diagram of one embodiment of a conventional voltage reference circuit.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment, structure," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for generating a reference voltage. More specifically, the system uses a voltage reference circuit to produce the reference voltage using pseudo resistors in different legs of a current mirror circuit. The pseudo resistors include transistors that have an associated resistance. The system uses transistors in the pseudo resistors of the same transistor type and biases the gate and source voltages to the same potential to produce the desired reference voltage.

In some conventional systems using a conventional reference voltage circuit 100, such as the circuit shown in FIG. 1, the reference voltage 106 is based in large part on the values of the resistors 102 and the ratio of the resistors values. The reference voltage 106 includes a pair 101 of transistors biased with the same gate voltage but different source voltages. The pair 101 of transistors creates an accurate PTAT voltage when biased in sub-threshold mode. The pair 101 of transistors and the resistor $R_1$ make up the PTAT voltage generator in the conventional voltage reference circuit 100. Additional resistors 108 are sometimes used to implement a self-biased cascode for the current mirror circuit 104 and for the cascode transistors 103. The cascode transistors 103 may also be operating in sub-threshold mode. In order to minimize the current drain of the conventional voltage reference circuit 100, the resistor sizes are large. Large resistor sizes can be expensive in plain CMOS technologies. High resistivity material may not be available in plain CMOS technologies, and can be an expensive process option to add.

Additionally, resistor matching in standard CMOS technologies tends to be worse than transistor matching. Because very low power reference circuits built with resistors also result in circuits that are physically larger than CMOS components, the resistors may be more susceptible to processing gradients, which further reduces matching accuracy. Additionally, producing very small currents may require the use of minimum width resistors to maximize the length/width ration of the resistors to maximize the resistance. Such parameters usually result in degraded matching performance, and thus, degraded accuracy of the reference voltage.

Consequently, a system that utilizes CMOS transistors as pseudo resistors, rather than standard resistors, to generate a reference voltage 106 may result in lower power consumption, reduced circuit size, improved accuracy, and less expensive manufacturing, while still providing a temperature independent, constant reference voltage for low power circuits.

Figure 2:
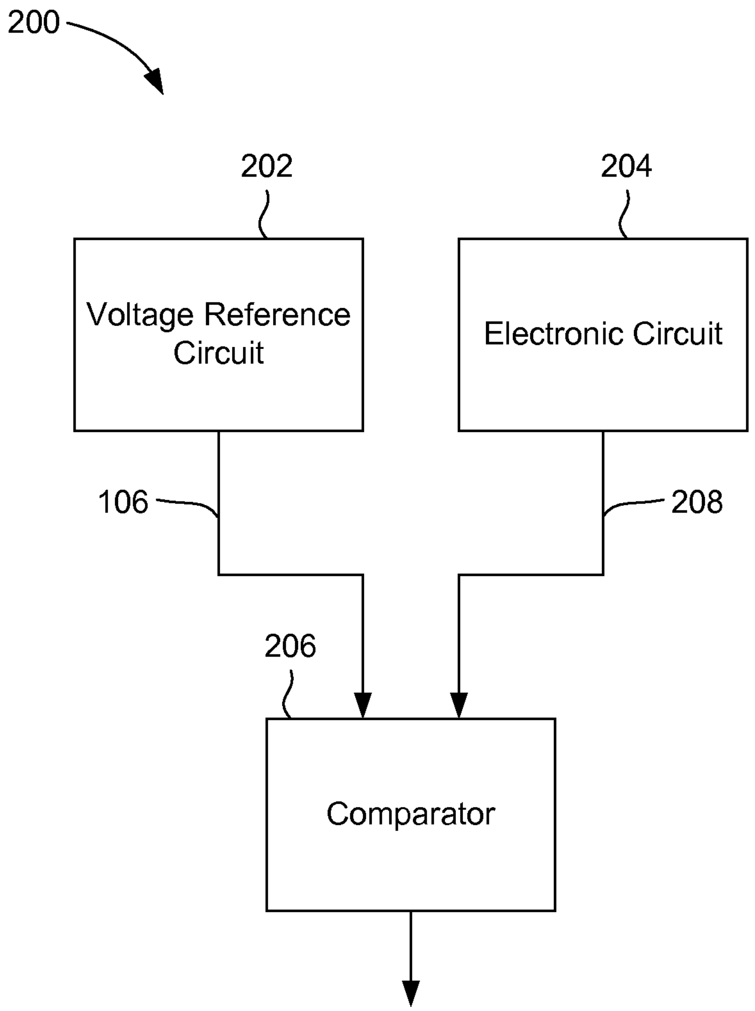
FIG. 2 depicts a block diagram of one embodiment of a system for comparing an output voltage to a reference voltage.

FIG. 2 depicts a block diagram of one embodiment of a system 200 for comparing an output voltage 208 to a reference voltage 106. In one embodiment, the system includes a voltage reference circuit 202 according to the principles described herein, an electronic circuit 204 other than the voltage reference circuit 202, and a comparator 206. The system 200 may be any system that includes at least one electronic circuit 204 whose output voltage 208 is compared to the reference voltage 106 produced by a voltage reference circuit 202 at the comparator 206.

In other embodiments, the reference voltage 106 may be used for other purposes. The system 200 may be a subsystem in a larger system or part of a larger component. The system 200 may be used to reduce the power consumption of a low power circuit. In one embodiment, the system 200 helps reduce the standby current of low-power, mixed-signal microcontrollers. During a standby mode, certain tasks may have to be accomplished with minimum impact on power consumption. In various embodiments, the system 200 may be used for tasks including, but not limited to, voltage regulation, power monitoring, pin-status monitoring, real-time clock applications, and data logging.

In one embodiment in which minimal resources are used from a larger system that includes the voltage reference circuit 202 and other components, the voltage reference circuit 202 and a simple driver stage may be combined to create a low power voltage regulator that is able to maintain some status and control registers alive/operating during power down of the larger system. The voltage reference circuit 202 may be used in a power management unit (PMU) in regulators responsible for state retention during power down, power for control registers, real time clock power, and other important tasks.

Figure 3:
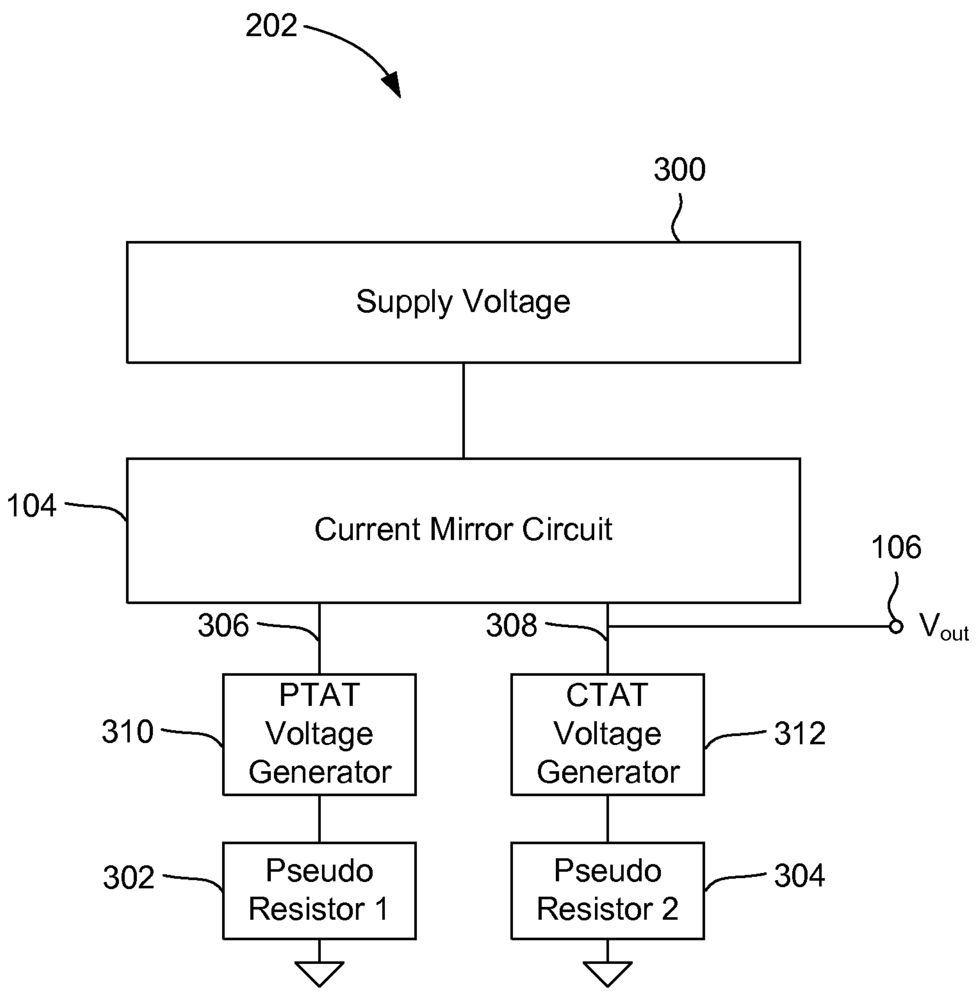
FIG. 3 depicts a block diagram of one embodiment of a voltage reference circuit.

FIG. 3 depicts a block diagram of one embodiment of the voltage reference circuit 202 of FIG. 2. While the system 200 is described in conjunction with the voltage reference circuit 202 of FIG. 2, the system 200 may be used in conjunction with any voltage reference circuit 202, according to the principles described herein. Conversely, the voltage reference circuit 202 of FIG. 2 may be used in conjunction with any electronic system and with any other electronic devices or components.

In one embodiment, the voltage reference circuit 202 includes a supply voltage 300, a current mirror circuit 104, at least two pseudo resistors 302, 304 located on separate legs 306, 308 of the current mirror circuit 104, a proportional-to-absolute-temperature (PTAT) voltage generator 310 on the first leg 306 above the first pseudo resistor 302, and a complimentary-to-absolute-temperature (CTAT) voltage generator 312 on the second leg 308 above the second pseudo resistor 304.

The current mirror circuit 104 is connected to the supply voltage 300. The supply voltage 300 may be any type of supply voltage 300, including a positive supply voltage 300 or a negative supply voltage 300. In an embodiment where the voltage reference circuit 202 is connected to a negative supply voltage 300, the implementation is complementary to the voltage reference circuit 202 depicted in FIG. 4, such that the PMOS and NMOS transistors are swapped out. The reference voltage 106 generated by configuring the voltage reference circuit 202 with a negative supply voltage 300 may be ground-based. In one embodiment, the PTAT voltage generator 310 on the first leg 306 is configured to produce a specific voltage across the first pseudo resistor 302, which may be connected to ground. In one embodiment, the first pseudo resistor 302 and the second pseudo resistor 304 refer to the same voltage potential, such that the first pseudo resistor 302 and the second pseudo resistor 304 are both connected to ground.

The first pseudo resistor 302 then converts the PTAT voltage to a current. The current mirror circuit 104 copies the current across multiple legs, such that each leg has the same current or a scaled version of the copied current.

In one embodiment, the current in the first leg 306 of the current mirror circuit 104 is based on the PTAT voltage and the resistance value of the first pseudo resistor 302. The first pseudo resistor 302, as described herein, includes at least one transistor. The transistor may have a nonlinear resistivity that influences the current. However, the second pseudo resistor 304 on the second leg 308 of the current mirror circuit 104 also includes a transistor of the same type as the transistor of the first pseudo resistor 302. Because the transistors have the same type, and because their gate-source voltages are identical, undesired effects due to the nonlinear resistivity of the transistors cancels. Additionally, the second leg 308 includes the CTAT voltage generator 312. The transistors in the CTAT voltage generator 312 may be operating in sub-threshold mode. The reference voltage 106 output by the voltage reference circuit 202, which is produced by summing the PTAT voltage, which has been converted back from the mirrored current according to a predetermined ratio, across the second pseudo resistor 304 with the CTAT voltage, is temperature independent.

Figure 4:
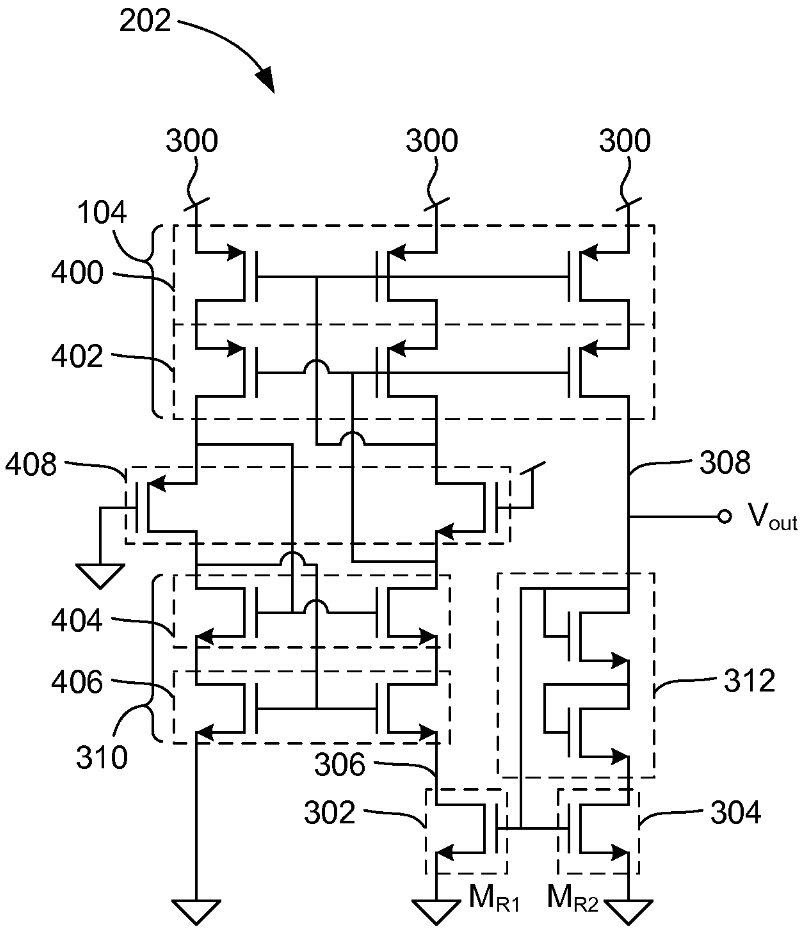
FIG. 4 depicts a schematic diagram of one embodiment of a voltage reference circuit of FIG. 3.

FIG. 4 depicts a schematic diagram of one embodiment of the voltage reference circuit 202 of FIG. 2. While the system 200 is described in conjunction with the voltage reference circuit 202 of FIG. 4, the system 200 may be used in conjunction with any voltage reference circuit 202, according to the principles described herein. Conversely, the voltage reference circuit 202 of FIG. 4 may be used in conjunction with any electronic system and with any other electronic devices or components.

The voltage reference circuit 202 may be a voltage reference circuit that uses various types of CMOS technologies, including n-type transistors (NMOS) and p-type transistors (PMOS). In one embodiment, the voltage reference circuit 202 includes a cascode current mirror circuit 104. The cascode current mirror circuit 104 may include several cascode transistors pairs. The cascode current mirror circuit 104 may reduce dependencies on the voltage produced by the supply voltage 300 and the temperature of the components. Other types of current mirror circuits 104 may be used in the voltage reference circuit 202 to copy a current to one or more legs. In one embodiment, the current in all legs connected to the current mirror circuit 104 are equal with a current mirror ratio of one. Other embodiments may use different current mirror ratios.

In one embodiment, the mirrored legs of the current mirror circuit 104 include first and second PMOS cascode transistor pairs 400, 402 to bias reference generators and to mirror the current across all legs connected to the current mirror circuit 104. Additionally, a pair of legs may include third and fourth NMOS transistor pairs 404, 406 below the biasing transistor pairs 400, 402. The third and fourth NMOS transistor pairs

404, 406 may be part of the PTAT voltage generator 310 configured to produce the PTAT voltage. Because the current through the transistors of the fourth transistor pair 406 is equal, the gate-to-source voltages are also equal if the drain-to-source voltage variation is small. Also, because the gates of the fourth transistor pair 406 are tied together, the sources are at the same voltage, as well. The third transistor pair 404 may equalize the drain voltages of the fourth transistor pair 406. Consequently, multiple cascode transistor pairs may help ensure accuracy in the voltage levels of the circuit.

Some embodiments may derive the bias of the cascode transistor pairs from a separate bias network in order to lower the minimum supply voltage 300. In some embodiments, the cascode current mirror circuit 104 may include self-biased cascodes using a pair of pseudo resistors 408 to decrease reference current consumption by limiting the number of current legs in the current mirror circuit 104. The bias pseudo resistors 408 include transistors, rather than resistors, positioned in each of the respective legs to bias the gates of the transistors in the current mirror circuit 104.

In one embodiment, the transistors of the PTAT voltage generator 310 and the CTAT voltage generator 312 are saturated in sub-threshold mode. The transistors operate in sub-threshold mode when the gate-to-source voltage is below the threshold voltage of the transistor. Operating the transistors in sub-threshold mode allows the supply voltage 300 to be scaled down to reduce dynamic power consumption and to keep electric fields low for device reliability.

The voltage at the sources of the fourth transistor pair 406, in conjunction with the resistance of the transistor of the first pseudo resistor 302, may determine the current mirrored by the current mirror circuit 104. Because the current is copied, at some ratio of the copied current, from the first leg 306 to the second leg 308 of the current mirror circuit 104, the reference voltage 106 output by the voltage reference circuit 202 is based on the copied current and the resistance of the transistor of the second pseudo resistor 304 that is located in the second leg 308. The second leg 308 may also include one or more cascode transistors as the CTAT voltage generator 312 to cancel the temperature effects introduced by the PTAT voltage.

Figure 5:
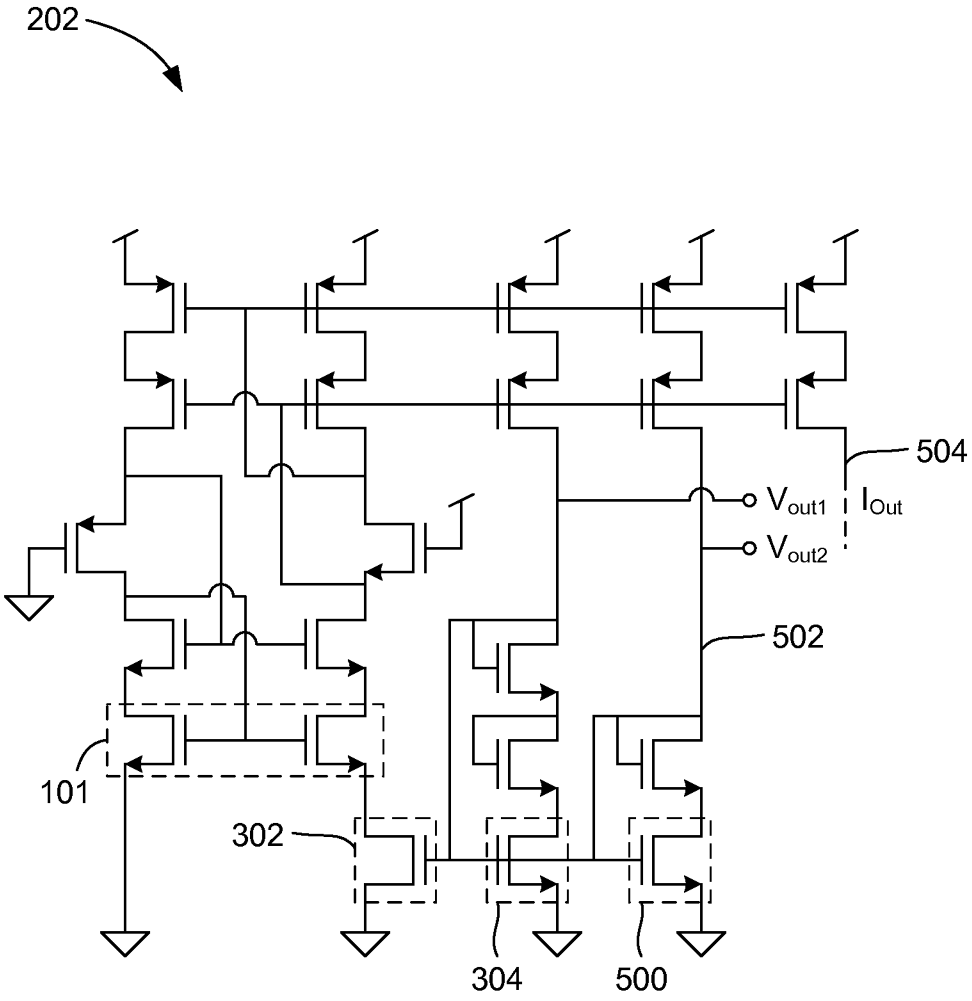
FIG. 5 depicts a schematic diagram of one embodiment of a voltage reference circuit of FIG. 3.

FIG. 5 depicts a schematic diagram of one embodiment of the voltage reference circuit 202 of FIG. 2. While the system 200 is described in conjunction with the voltage reference circuit 202 of FIG. 5, the system 200 may be used in conjunction with any voltage reference circuit 202, according to the principles described herein. Conversely, the voltage reference circuit 202 of FIG. 5 may be used in conjunction with any electronic system and with any other electronic devices or components.

The voltage reference circuit 202 may include multiple legs for the current mirror circuit 104. Each leg may output a reference voltage 106 or a reference current 504. Consequently, the voltage reference circuit 202 may output one or more reference voltages 106 and one or more reference currents. The reference current may be nearly proportional to temperature, and may thus be used to generate constant transconductance bias for sub-threshold circuits. Each reference voltage 106 may be determined based on the ratio of the copied current in the corresponding leg and the device matching between the transistors in the various pseudo resistors, 302, 304, 500. For example, the pseudo resistor of the second leg 308 may produce a reference voltage 106 at a first level, and the pseudo resistor 500 of a third leg 502 may produce a reference voltage 106 at a second level either higher or lower than the reference voltage 106 at the first level. The different output voltages may be determined based on the sizes of the transistors in the pseudo resistors, the PTAT voltage generator 310, the CTAT voltage generator 312, other components or any combinations thereof.

In various embodiments, the pseudo resistors used to bias the transistors of the current mirror circuit 104 may include inputs to power down the voltage reference circuit 202. The power down inputs may stop current flow through the pseudo resistors, preventing the current mirror circuit 104 from copying a current to the legs at the outputs. Powering down the voltage reference circuit 202 may help reduce power consumption when the voltage reference circuit 202 is not being used.

Figure 6:
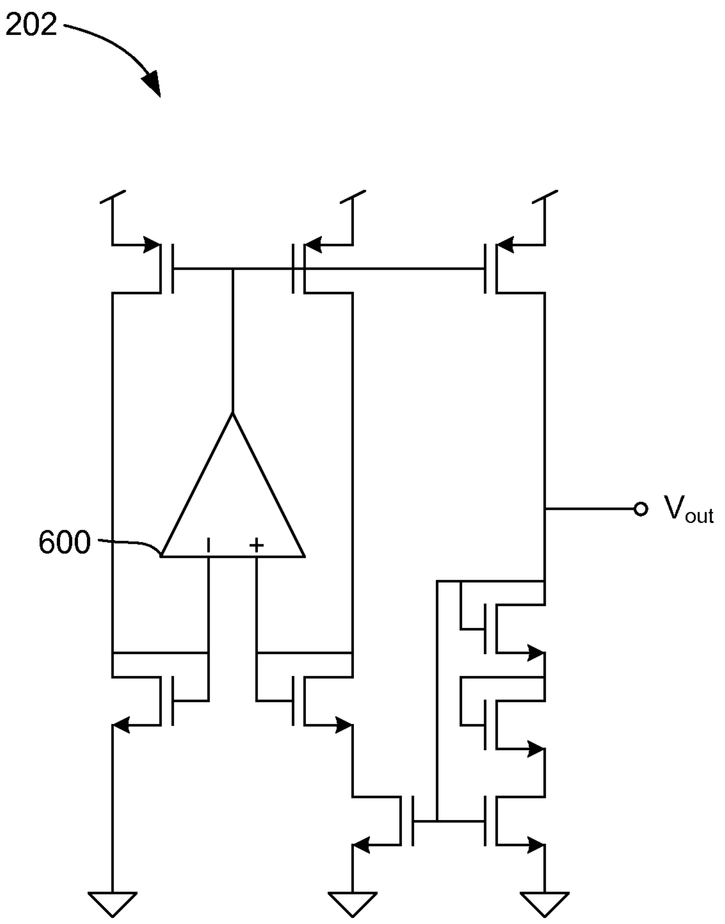
FIG. 6 depicts a schematic diagram of one embodiment of a voltage reference circuit of FIG. 3.

FIG. 6 depicts a schematic diagram of one embodiment of the voltage reference circuit 202 of FIG. 2. While the system 200 is described in conjunction with the voltage reference circuit 202 of FIG. 6, the system 200 may be used in conjunction with any voltage reference circuit 202, according to the principles described herein. Conversely, the voltage reference circuit 202 of FIG. 6 may be used in conjunction with any electronic system and with any other electronic devices or components.

The voltage reference circuit 202 may include various implementations of the different components. For example, the current mirror circuit 104 may include an operational amplifier 600, as shown in FIG. 6. The voltage reference circuit 202 may utilize other components, such as bipolar junction transistors (BJTs), which may include certain characteristics useful for generating the reference voltage 106. As long as the gate-to-substrate and source-to-substrate voltages of the pseudo resistors are equal, respectively, the transistor nonlinearities cancel each other out, and provide resistance characteristics useful for a low-power voltage reference circuit 202.

Figure 7:
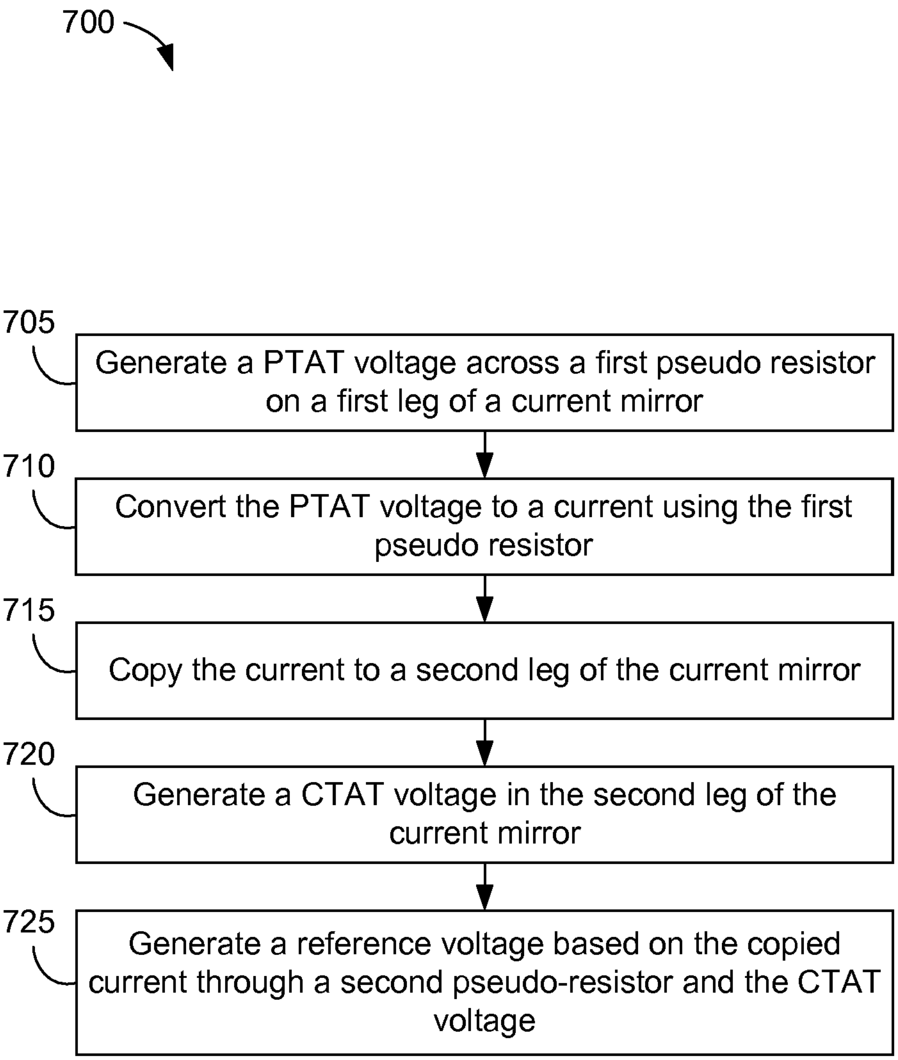
FIG. 7 depicts a flowchart diagram of one embodiment of a method for generating a reference voltage.

FIG. 7 depicts a flowchart diagram of one embodiment of a method 700 for generating a reference voltage 106. Although the method 700 is described in conjunction with the voltage reference circuit 202 of FIG. 3, the method 700 may be used in conjunction with any type of voltage reference circuit 202.

In one embodiment, the voltage reference circuit 202 is configured to generate 705 a proportional-to-absolute-temperature (PTAT) voltage across the first pseudo resistor 302. The first pseudo resistor 302 includes a transistor in the first leg 306 of the current mirror circuit 104.

The voltage reference circuit 202 then converts 710 the PTAT voltage to a current in the first leg 306 of the current mirror circuit 104 based on a resistance of the first pseudo resistor 302. Because the PTAT voltage is proportional to the temperature, the current is also proportional to the temperature.

The current mirror circuit 104 copies 715 the current to a second leg 308 of the current mirror circuit 104. In some embodiments, the current mirror circuit 104 may copy the current to any number of mirrored legs in the current mirror circuit 104, each associated with a separate reference voltage 106 or reference current output by the voltage reference circuit 202. The current mirror circuit 104 may be any type of current mirror circuit 104, such as a cascode current mirror. In one embodiment, at least some of the cascode transistors in the voltage reference circuit 202 are self-biased. Some or all of transistors in the voltage reference circuit 202 may be saturated. The self-biasing may be implemented by using bias pseudo resistors to maintain the cascode transistors 104 in saturation. The bias pseudo resistors may include a power down input to prevent current flow through the cascode transistors and to power down the voltage reference circuit 202.

The voltage reference circuit 202 generates 720 a complimentary-to-absolute temperature (CTAT) voltage in the second leg 308 of the current mirror circuit 104. The CTAT voltage may be generated by a CTAT voltage generator 312 above the second pseudo resistor 304. The CTAT voltage generator 312 may include at least one transistor in the second leg 308. In one embodiment, the voltage reference circuit 202 is configured to set the transistors in the PTAT voltage generator 310 and the CTAT voltage generator 312 to operate in sub-threshold mode.

The voltage reference circuit 202 generates 725 a reference voltage 106 based on the CTAT voltage, a resistance of the second pseudo resistor 304, and the current copied from the first leg 306 to the second leg 308. The second pseudo resistor 304 includes a transistor in the second leg 308 of the current mirror circuit 104. The first pseudo resistor 302 and the second pseudo resistor 304 have equal resistance types. The gate-to-substrate voltage and source-to-substrate voltage of the transistor of the first pseudo resistor 302 is set equal to the corresponding voltage values of the transistor of the second pseudo resistor 304. Additionally, the transistors of the pseudo resistors may be the same transistor type, such that the transistors have equal threshold voltages, oxide capacitance, and electron mobility. By setting the gate and source voltages to the same voltage potential, and by using the same transistor types, the nonlinearity, temperature, voltage, and process dependencies of the pseudo resistors cancel each other out.

In one embodiment, the gates for the transistors of the first pseudo resistor 302 and the second pseudo resistor 304 are connected to the reference voltage 106 that is output by the voltage reference circuit 202 corresponding to the second pseudo resistor 304. Biasing the gates of the pseudo resistors with the reference voltage 106 may keep variations in current small and predictable, and may make the reference voltage 106 independent of variations in the supply voltage 300.

The operation of one embodiment of the voltage reference circuit 202 is described below. The drain current of a saturated transistor in sub-threshold (weak inversion) mode is $$I_D = I_{D0}\frac{W}{L}\cdot\exp\left(\frac{V_G}{n\cdot V_T}\right)\left(\exp\left(\frac{-V_S}{V_T}\right)-\exp\left(\frac{-V_D}{V_T}\right)\right).$$

This current includes two components—a forward and a reverse drift of carriers through the channel. If the drain voltage is larger than the source voltage, the forward current component is much larger than the reverse current. This means that the transistor is saturated.

If $V_{DS}>4V_T$, the exp $$\left(\frac{-V_S}{V_T}\right)$$

component is approximately 55 times larger than the exp $$\left(\frac{-V_D}{V_T}\right)$$

component. The drain current for the saturated transistor in sub-threshold may thus be expressed as:

$$I_D = I_{D0}\frac{W}{L}\exp\left(\frac{V_G - n\cdot V_S}{n\cdot V_T}\right).$$

In the above equation, $I_{D0}$ is the residual drain current of a saturated unity size transistor with zero bias voltages ($V_G=V_S=0$). Using the drain current for the saturated transistor in subthreshold, the voltage across resistor $R_1$ or a standard resistor in a leg of the current mirror, as in FIG. 1, can be represented as:

$$V_{R1} = V_T \ln\left(\frac{I_{D1}\cdot W_2/L_2}{I_{D2}\cdot W_1/L_1}\right)$$

if the transistors 101 are not in the separate well. If the transistors 101 are in a separate well and their bulk nodes are connected to their source node, the voltage becomes:

$$V_{R1} = n\cdot V_T\cdot \ln\left(\frac{I_{D1}\cdot W_2/L_2}{I_{D2}\cdot W_1/L_1}\right).$$

The reference voltage 106 at the output of FIG. 1 thus becomes for the first case of no separate wells:

$$V_{out} = \frac{R_2}{R_1}\cdot V_T\cdot \ln\left(\frac{I_{D1}\cdot W_2/L_2}{I_{D2}\cdot W_1/L_1}\right) + 2V_{GS}.$$

The resistors of FIG. 1 may be replaced with pseudo resistors that include transistors, despite the nonlinearity of the transistors, since the nonlinearities compensate each other. The on-resistance of a MOS transistor is:

$$R_{on} = \frac{1}{\mu\cdot C_{OX}\cdot W/L\cdot(V_{GS} - V_T)}$$

Using the on-resistance in the reference voltage 106 shown above, the output reference voltage 106 becomes:

$$V_{out} = V_T\cdot \ln\left(\frac{\mu\cdot C_{OX1}\cdot W_{R1}/L_{R1}\cdot(V_{GS1} - V_{T2})}{\mu\cdot C_{OX2}\cdot W_{R2}/L_{R2}\cdot(V_{GS1} - V_{T1})}\right)V_T\cdot \ln\left(\frac{I_{D1}\cdot W_2/L_2}{I_{D2}\cdot W_1/L_1}\right) + 2V_{GS}$$

By using the same transistor types and biasing the gate and source voltages to the same potential, the reference voltage 106 then becomes:

$$V_{out} = \frac{W_{R1}/L_{R1}}{W_{R2}/L_{R2}} V_T \ln\left(\frac{I_{D1}\cdot W_2/L_2}{I_{D2}\cdot W_1/L_1}\right) + 2V_{GS}.$$

Other variations of the voltage reference circuit 202 may be used to obtain different reference voltages 106 by changing transistor sizes, making additional adjustments to the current mirror circuit 104 and/or introducing additional components into the voltage reference circuit 202. In some embodiment, the supply voltage 300 may be a negative supply voltage 300 with the voltage reference circuit 202 in complimentary form. The output voltage for a ground based reference circuit with a similar transistor and pseudo resistor setup to the voltage reference circuit 202 of FIG. 4 is:

$$V_{out} = V_{DD}\frac{W_{R1}/L_{R1}}{W_{R2}/L_{R2}}\cdot V_T\cdot \ln\left(\frac{I_{D1}\cdot W_2/L_2}{I_{D2}\cdot W_1/L_1}\right) + 2V_{GS}.$$

Although the voltage reference circuit 202 is shown herein in specific embodiments using certain configurations of CMOS technologies, embodiments using other configurations of CMOS technologies may be used. Additionally, the pseudo resistors may include one or more transistors to obtain the desired resistance for each leg of the current mirror circuit 104. Also, the transistors in the pseudo resistors may be designed to produce specific reference voltages 106 depending on the implementation of the voltage reference circuit 202.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A low power, resistor-less voltage reference circuit, comprising:

a proportional-to-absolute-temperature (PTAT) voltage generator configured to produce a PTAT voltage across a first pseudo resistor, wherein the first pseudo resistor comprises a transistor, wherein the PTAT voltage across the first pseudo resistor produces a current based on a resistance of the first pseudo resistor;

a current mirror circuit configured to mirror the current;

a second pseudo resistor comprising a transistor, wherein the second pseudo resistor is used to convert the mirrored current to a converted PTAT voltage, wherein the first pseudo resistor and the second pseudo resistor comprise equal transistor types; and a complementary-to-absolute-temperature (CTAT) voltage generator configured to produce a CTAT voltage, wherein the CTAT voltage is summed with the converted PTAT voltage to produce a reference voltage, wherein the reference voltage is temperature independent.

2. The voltage reference circuit of claim 1, wherein the PTAT voltage generator and the CTAT voltage generator comprise transistors operating in sub-threshold mode.

3. The voltage reference circuit of claim 2, wherein the current mirror circuit comprises bias pseudo resistors configured to maintain cascode transistors of the current mirror circuit in saturation.

4. The voltage reference circuit of claim 3, wherein the bias pseudo resistors each comprise a power down input to prevent current flow through the current mirror circuit.

5. The voltage reference circuit of claim 1, wherein the transistor of the first pseudo resistor comprises a gate-to-substrate voltage and a source-to-substrate voltage equal to corresponding voltage values of the transistor of the second pseudo resistor.

6. The voltage reference circuit of claim 5, wherein gates for the transistor of the first pseudo resistor and the transistor of the second pseudo resistor are connected to the reference voltage.

7. The voltage reference circuit of claim 1, wherein the transistor of the first pseudo resistor and the transistor of the second pseudo resistor comprise equal threshold voltages, oxide capacitance, and electron mobility.

8. A method for generating a reference voltage, the method comprising:

generating a proportional-to-absolute temperature (PTAT) voltage across a first pseudo resistor, wherein the first pseudo resistor comprises a transistor;

converting the PTAT voltage to a current based on a resistance of the first pseudo resistor;

mirroring the current using a current mirror circuit;

converting the mirrored current to a converted PTAT voltage using a second pseudo resistor, wherein the second pseudo resistor comprises a transistor, wherein the first pseudo resistor and the second pseudo resistor comprise equal transistor types;

generating a complementary-to-absolute temperature (CTAT) voltage; and summing the converted PTAT voltage and the CTAT voltage to produce the reference voltage, wherein the reference voltage is temperature independent.

9. The method of claim 8, wherein the current mirror circuit comprises a cascode current mirror.

10. The method of claim 8, further comprising self-biasing cascode transistors in the current mirror circuit using bias pseudo resistors to maintain the cascode transistors of the current mirror circuit in saturation.

11. The method of claim 10, further comprising preventing current flow through the current mirror circuit via a power down input to the bias pseudo resistors.

12. The method of claim 8, further comprising setting a gate-to-substrate voltage and a source-to-substrate voltage of the transistor of the first pseudo resistor equal to corresponding voltage values of the transistor of the second pseudo resistor.

13. The method of claim 12, wherein gates for the transistor of the first pseudo resistor and the transistor of the second pseudo resistor are connected to the reference voltage.

14. The method of claim 8, wherein the transistor of the first pseudo resistor and the transistor of the second pseudo resistor comprise equal threshold voltages, oxide capacitance, and electron mobility.

15. A system, comprising:

an electronic circuit configured to generate an output voltage;

a voltage reference circuit, the voltage reference circuit comprising:

a proportional-to-absolute-temperature (PTAT) voltage generator configured to produce a PTAT voltage across a first pseudo resistor, wherein the first pseudo resistor comprises a transistor, wherein the PTAT voltage across the first pseudo resistor produces a current based on a resistance of the first pseudo resistor;

a current mirror circuit configured to mirror the current;

a second pseudo resistor comprising a transistor, wherein the second pseudo resistor is used to convert the mirrored current to a converted PTAT voltage, wherein the first pseudo resistor and the second pseudo resistor comprise equal transistor types; and a complementary-to-absolute-temperature (CTAT) voltage generator configured to produce a CTAT voltage, wherein the CTAT voltage is summed with the converted PTAT voltage to produce a reference voltage, wherein the reference voltage is temperature independent; and a comparator configured to compare the output voltage of the electronic circuit to the reference voltage.

16. The system of claim 15, wherein the current mirror circuit comprises a cascode current mirror, wherein the cascode current mirror comprises bias pseudo resistors configured to maintain the cascode transistors of the current mirror circuit in saturation.

17. The system of claim 16, wherein the bias pseudo resistors each comprise a power down input to prevent current flow through the current mirror circuit.

18. The system of claim 15, wherein the transistor of the first pseudo resistor comprises a gate-to-substrate voltage and a source-to-substrate voltage equal to corresponding voltage values of the transistor of the second pseudo resistor.

19. The system of claim 18, wherein gates for the transistor of the first pseudo resistor and the transistor of the second pseudo resistor are connected to the reference voltage.

20. The system of claim 15, wherein the transistor of the first pseudo resistor and the transistor of the second pseudo resistor comprise equal threshold voltages, oxide capacitance, and electron mobility.

* * * * *